UNITED STATES PATENT OFFICE.

LEO H. BAEKELAND, OF YONKERS, NEW YORK, ASSIGNOR TO ROBESON PROCESS COMPANY, OF CAMDEN, NEW JERSEY, A CORPORATION OF NEW JERSEY.

METHOD OF IMPREGNATING WOOD AND PRODUCTS THEREOF.

1,057,211.  Specification of Letters Patent.  Patented Mar. 25, 1913.

No Drawing. Original application filed November 21, 1907, Serial No. 403,226. Renewed June 11, 1910, Serial No. 566,356. Divided and this application filed February 7, 1912. Serial No. 675,957.

*To all whom it may concern:*

Be it known that I, LEO H. BAEKELAND, a citizen of the United States, residing at Yonkers, in the county of Westchester and State of New York, have invented certain new and useful Improvements in Methods of Impregnating Wood and Products Thereof, of which the following is a specification.

This invention relates to methods of impregnating wood and products thereof; and it comprises a method of preserving and treating wood to increase its strength and hardness and its resistance against fire and decomposition wherein wood, or other fibrocellular material of like nature, is impregnated with a liquid comprising or consisting of a solution of the soluble bodies occurring in waste sulfite liquor; and it also comprises wood or similar fibrocellular material having its pores filled or partially filled with material consisting of or comprising the soluble matters of sulfite waste liquor; all as more fully hereinafter set forth and as claimed.

Waste sulfite liquor is the watery waste effluent from the sulfite process of making paper pulp in which wood is digested under heat and pressure with an aqueous solution of bisulfites; generally bisulfites of magnesia and lime, dolomitic lime being usually employed in making the liquor. In the pulping process about half the woody material goes into solution giving dissolved colloidal extractive matters and complex sulfur-containing organic bodies. These organic bodies are, at least in part, in combination with the calcium and other bases present and, for convenience of nomenclature, the solubles of the solution are often called "lignosulfonates" of these bases, the new complex oxysulfur acids present being probably, at least in part, in the nature of sulfonic acids derived from the lignone of the wood. The dissolved matters have tanning and antiseptic properties. As the liquid comes from the digesters, it is a rather weak solution which offers difficulties in concentration. It may however be concentrated (see Patent 833,634) to form a thick, viscid stable product having many commercial uses.

I have found that the waste sulfite liquor may be utilized for preserving wood and that when so used it not only renders the wood more resistant against decay or change, whether by the action of ferment organisms, fungi or insects, but also gives it other desirable properties, making it harder, denser and more compact. I may employ either the crude liquor as it flows from the digester, or the liquor concentrated by a preliminary evaporation. I consider the latter the more advantageous, since apart from the convenience of greater density which enables the conveyance of more material into the wood pores in a single impregnation or saturation, the concentrated liquor when properly prepared is more stable, even upon redilution, and is otherwise more desirable. However the crude thin liquid may be employed using as many impregnations therewith as may be necessary to secure the desired amount of sulfite liquor solids in the pores of the wood. The crude liquid is ordinarily slightly acid in reaction; and it may be, and advantageously is, neutralized by an alkaline product, as for instance lime or a soluble alkali or alkaline salt, as for instance sodium silicate. The concentrated liquid is ordinarily neutralized before concentration.

The sulfite liquor may be admixed with or used in connection with other substances, such as fire-proofing salts like phosphates, tungstates, silicates, aluminum salts, ammonium salts, zinc chlorid, etc., since it offers a number of advantages in such use, as, for instance, in restraining crystallization, preventing efflorescence, etc. Preservation of wood and the like by sulfite liquor in conjunction with other preservatives however I do not specifically claim in the present application, claims thereto forming part of the subject matter of my prior and copending application Serial Number 403,226, filed November 21, 1907, and renewed as Serial No. 566,356, June 11, 1910, whereof the present application is divisional. Where the sulfite liquor is employed exclusively, as in the specific invention claimed in this case, advantageous products result. The soluble matters of the sulfite liquor have an antiseptic action and tan or coagulate and render insoluble some of the albuminoids and other putrescible bodies present in fresh or green wood, converting them into forms little susceptible to putrefaction and little available as food for organisms, whether insects, bacteria or fungi. And the colloid extractive matters and solubles, organic and inorganic, of the sulfite liquor, after impregnating the wood therewith and drying, fill, or partially fill, the pores, giving a material in or between the wood cells and fibers which is of a nature not unlike that of wood. The sulfite liquor represents dissolved "lignone." In the case of soft woods, which are generally "soft" because of their open or porous texture, this is important. The impregnation strengthens, hardens and compacts the wood, renders it more resistant to pressure or breaking stress and permits it to receive and retain an improved finish. And the wood is rendered more resistant to fire and flame by the closure or diminution of the pores since the amount of included air is thereby lessened.

The impregnation of the wood may be effected by simply soaking it in the waste liquor, either the crude thin liquor, which is best neutralized prior thereto, or in a concentrated product, until the liquor has penetrated to the desired or a sufficient extent, and then removing and drying the wood. The impregnation may however be improved or accelerated by any of the well known methods involving the use of boiling or vacuum or pressure, as by boiling under pressure. With a vacuum, the air may be removed from the wood, facilitating the entrance of the sulfite liquor. But the impregnation proper is best under the action of heat and pressure. After the impregnation the wood may be dried in the usual way. Using sulfite waste liquor concentrated by a preliminary evaporation, the effect of the treatment is increased.

The product resulting from impregnating wood, or like fibrocellular material, with sulfite liquor exclusively, has the pores charged with the dried colloidal extractive and tanning matters of the sulfite liquor and its salts, such as the lime salts of the contained oxysulfur or sulfonic acids. Its porosity is diminished to the extent to which the pores have been charged with such matters, making it more fire resistant, and denser and more compact. Its hardness is also improved by this reduction of porosity while the incorporated matter, unlike mineral salts, is not of such character as to injure tools used in working it.

What I claim is:—

1. The herein described product consisting of a fibrocellular body treated with waste sulfite liquor exclusively.

2. The herein described product consisting of a fibrocellular body impregnated with waste sulfite liquor exclusively.

3. The herein described method which consists in treating a fibrocellular body with waste sulfite liquor exclusively.

4. The herein described method which consists in treating a fibrocellular body with waste sulfite liquor exclusively under the action of pressure.

5. The herein described method which consists in treating a fibrocellular body with waste sulfite liquor under the action of heat and pressure.

In testimony whereof, I affix my signature in the presence of two subscribing witnesses.

LEO H. BAEKELAND.

Witnesses:
HERBERT S. MAY,
JOS. C. FULLER.

---

It is hereby certified that in Letters Patent No. 1,057,211, granted March 25, 1913, upon the application of Leo H. Baekeland, of Yonkers, New York, for an improvement in "Methods of Impregnating Wood and Products Thereof," an error appears in the printed specification requiring correction as follows: Page 2, line 69, after the word "liquor" insert the word *exclusively;* and that the said Letters Patent should be read with this correction therein that the same may conform to the record of the case in the Patent Office.

Signed and sealed this 15th day of April, A. D., 1913.

[SEAL.]

C. C. BILLINGS,

*Acting Commissioner of Patents.* inorganic, of the sulfite liquor, after impregnating the wood therewith and drying, fill, or partially fill, the pores, giving a material in or between the wood cells and fibers which is of a nature not unlike that of wood. The sulfite liquor represents dissolved "lignone." In the case of soft woods, which are generally "soft" because of their open or porous texture, this is important. The impregnation strengthens, hardens and compacts the wood, renders it more resistant to pressure or breaking stress and permits it to receive and retain an improved finish. And the wood is rendered more resistant to fire and flame by the closure or diminution of the pores since the amount of included air is thereby lessened.

The impregnation of the wood may be effected by simply soaking it in the waste liquor, either the crude thin liquor, which is best neutralized prior thereto, or in a concentrated product, until the liquor has penetrated to the desired or a sufficient extent, and then removing and drying the wood. The impregnation may however be improved or accelerated by any of the well known methods involving the use of boiling or vacuum or pressure, as by boiling under pressure. With a vacuum, the air may be removed from the wood, facilitating the entrance of the sulfite liquor. But the impregnation proper is best under the action of heat and pressure. After the impregnation the wood may be dried in the usual way. Using sulfite waste liquor concentrated by a preliminary evaporation, the effect of the treatment is increased.

The product resulting from impregnating wood, or like fibrocellular material, with sulfite liquor exclusively, has the pores charged with the dried colloidal extractive and tanning matters of the sulfite liquor and its salts, such as the lime salts of the contained oxysulfur or sulfonic acids. Its porosity is diminished to the extent to which the pores have been charged with such matters, making it more fire resistant, and denser and more compact. Its hardness is also improved by this reduction of porosity while the incorporated matter, unlike mineral salts, is not of such character as to injure tools used in working it.

What I claim is:—

1. The herein described product consisting of a fibrocellular body treated with waste sulfite liquor exclusively.

2. The herein described product consisting of a fibrocellular body impregnated with waste sulfite liquor exclusively.

3. The herein described method which consists in treating a fibrocellular body with waste sulfite liquor exclusively.

4. The herein described method which consists in treating a fibrocellular body with waste sulfite liquor exclusively under the action of pressure.

5. The herein described method which consists in treating a fibrocellular body with waste sulfite liquor under the action of heat and pressure.

In testimony whereof, I affix my signature in the presence of two subscribing witnesses.

LEO H. BAEKELAND.

Witnesses:
 HERBERT S. MAY,
 JOS. C. FULLER.

---

It is hereby certified that in Letters Patent No. 1,057,211, granted March 25, 1913, upon the application of Leo H. Baekeland, of Yonkers, New York, for an improvement in "Methods of Impregnating Wood and Products Thereof," an error appears in the printed specification requiring correction as follows: Page 2, line 69, after the word "liquor" insert the word *exclusively*; and that the said Letters Patent should be read with this correction therein that the same may conform to the record of the case in the Patent Office.

Signed and sealed this 15th day of April, A. D., 1913.

[SEAL.]

C. C. BILLINGS,

*Acting Commissioner of Patents.*

Correction In Letters Patent No. 1,057,211.

It is hereby certified that in Letters Patent No. 1,057,211, granted March 25, 1913, upon the application of Leo H. Baekeland, of Yonkers, New York, for an improvement in "Methods of Impregnating Wood and Products Thereof," an error appears in the printed specification requiring correction as follows: Page 2, line 69, after the word "liquor" insert the word *exclusively;* and that the said Letters Patent should be read with this correction therein that the same may conform to the record of the case in the Patent Office.

Signed and sealed this 15th day of April, A. D., 1913.

[SEAL.]

C. C. BILLINGS,

*Acting Commissioner of Patents.*